United States Patent
Kim et al.

(10) Patent No.: US 11,322,303 B2
(45) Date of Patent: *May 3, 2022

(54) MULTILAYER CERAMIC CAPACITOR HAVING INTERNAL ELECTRODES WHICH INCLUDE NICKEL AND ANTIMONY

(71) Applicant: SAMSUNG ELECTRO-MECHANICS CO., LTD., Suwon-si (KR)

(72) Inventors: Dong Jin Kim, Suwon-si (KR); Chang Hak Choi, Suwon-si (KR); Byung Chui Jang, Suwon-si (KR); Jin Kyung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,455

(22) Filed: Nov. 25, 2020

(65) Prior Publication Data
US 2021/0104362 A1    Apr. 8, 2021

Related U.S. Application Data

(63) Continuation of application No. 16/171,188, filed on Oct. 25, 2018, now Pat. No. 10,879,001.

(30) Foreign Application Priority Data

Apr. 10, 2018    (KR) .................. 10-2018-0041460

(51) Int. Cl.
*H01G 4/008*  (2006.01)
*H01G 4/30*   (2006.01)
(Continued)

(52) U.S. Cl.
CPC ............. *H01G 4/0085* (2013.01); *H01G 4/30* (2013.01); *H01G 4/012* (2013.01); *H01G 4/1227* (2013.01); *H01G 4/232* (2013.01)

(58) Field of Classification Search
CPC ........ H01G 4/0085; H01G 4/30; H01G 4/232; H01G 4/1227; H01G 4/12; H01G 4/012
See application file for complete search history.

(56) References Cited

U.S. PATENT DOCUMENTS 7,277,268 B2    10/2007  Celik et al.
10,714,262 B2*   7/2020  Kim ........................ H01G 4/008
(Continued)

FOREIGN PATENT DOCUMENTS

CN    101546648 A    9/2009
JP    2005-008959 A  1/2005
(Continued)

OTHER PUBLICATIONS

Office Action issued in corresponding Korean Patent Application No. 10-2018-0041460 dated Apr. 29, 2019, with English translation.
(Continued)

*Primary Examiner* — David M Sinclair
(74) *Attorney, Agent, or Firm* — Morgan, Lewis & Bockius LLP

(57) ABSTRACT

A multilayer capacitor includes a body including a plurality of dielectric layers and a plurality of first and second internal electrodes alternately exposed to opposing surfaces of the body in a length direction with respective dielectric layers interposed therebetween, and first and second external electrodes disposed at opposing ends of the body in the length direction and connected to the first and second internal electrodes, respectively. The plurality of first and second internal electrodes include nickel (Ni) and antimony (Sb) or germanium (Ge).

8 Claims, 5 Drawing Sheets

(51) Int. Cl.
 *H01G 4/012* (2006.01)
 *H01G 4/232* (2006.01)
 *H01G 4/12* (2006.01)

(56) References Cited

U.S. PATENT DOCUMENTS

| | | | |
|---|---|---|---|
| 10,879,001 B2* | 12/2020 | Kim | H01G 4/30 |
| 2002/0150777 A1 | 10/2002 | Kerchner et al. | |
| 2004/0115468 A1 | 6/2004 | Wijenberg et al. | |
| 2006/0043523 A1 | 3/2006 | Ito et al. | |
| 2011/0031448 A1 | 2/2011 | Ota et al. | |
| 2011/0051314 A1 | 3/2011 | Sakurai et al. | |
| 2013/0250481 A1 | 9/2013 | Sekine et al. | |
| 2015/0125743 A1 | 5/2015 | Edwards et al. | |
| 2019/0304695 A1 | 10/2019 | Kim et al. | |

FOREIGN PATENT DOCUMENTS

| | | |
|---|---|---|
| JP | 4816202 B2 | 11/2011 |
| KR | 10-0950127 B1 | 3/2010 |
| KR | 10-2015-0015469 A | 2/2015 |
| KR | 10-2016-0135970 A | 11/2016 |
| WO | 03/033752 A1 | 4/2003 |

OTHER PUBLICATIONS

Notice of Allowance issued in corresponding U.S. Appl. No. 16/171,188 dated Aug. 26, 2020.
Final Office Action issued in corresponding U.S. Appl. No. 16/171,188 dated Jun. 19, 2020.
Non-Final Office Action issued in corresponding U.S. Appl. No. 16/171,188 dated Mar. 13, 2020.
Chinese Office Action dated Nov. 2, 2021, issued in corresponding Chinese Patent Application No. 201910021538.3.

* cited by examiner

I-I'

| II A | IV A | V A | VI A | VII A | VIII | | | I B | II B | III B | IV B | V B |
|---|---|---|---|---|---|---|---|---|---|---|---|---|
| Be 1556 | Ti 1940 | V 2190 | Cr 2176 | Mn 1517 | Fe 1809 | Co 1769 | Ni 1725 | Cu 1357 | Zn 693 | Al 932 | Si 1693 | |
| 15 x | 14 Ni₃Ti 1651 | 43 Ni₃V 1318 OR. | 50 x | 100 Ni₃Mn (?) OR. | 100 Ni₃Mn 776 OR. | 100 Ni₃Co (?) OR. | 100 | 100 | 40 x | 21 Ni₃Al 1668 | 18 Ni₃Si 1438 | |
| | | Nb 2740 | Mo 2890 | Tc 2490 | Ru 2700 | Rh 2239 | Pd 1823 | | | Ga 303 | Ge 1232 | As 1084 |
| | | 14 Ni₃Nb 1703 | 28 Ni₃Mo 1183 | | 30 x | 100 x | 100 x | | | 24 Ni₃Ga 1483 | 12 Ni₃Ge 1434 | 4 x |
| | | Ta 3269 | W 3650 | Re 3453 | Os 3300 | Ir 2727 | Pt 2043 | Au 1336 | | In 429 | Sn 505 | Sb 904 |
| | | 15 Ni₃Ta 1818 | 18 x | | 9 x | x | 100 Ni₃Pt 853 OR. | 100 x | | 15 Ni₃In 1113 | 10 Ni₃Sn 1447 | 8 x |

PRECIOUS METAL

FIG. 4

MULTILAYER CERAMIC CAPACITOR HAVING INTERNAL ELECTRODES WHICH INCLUDE NICKEL AND ANTIMONY

CROSS-REFERENCE TO RELATED APPLICATION

This application is the continuation application of U.S. patent application Ser. No. 16/171,188 filed on Oct. 25, 2018, which claims the benefit of priority to Korean Patent Application No. 10-2018-0041460 filed on Apr. 10, 2018 in the Korean Intellectual Property Office, the disclosures of which are incorporated herein by reference in their entirety.

BACKGROUND

1. Field

The present disclosure relates to a multilayer ceramic capacitor (or multilayer capacitor).

2. Description of Related Art

As electronic devices have tended to become more multifunctional and compact, electronic components have been required to be miniaturized and highly integrated.

In particular, in the case of multilayer ceramic capacitors (MLCCs) whose purposes and uses have been continuously increased as general-purpose electronic components, competition for dominating the market in advance is intense by developing ultra-high capacity products based on thinner dielectric layers and internal electrodes.

As the MLCCs have increasingly high capacity, the dielectric layers and internal electrodes are reduced in thickness, which causes short circuits, a DC bias failure, and reliability failures.

One of the reasons for the frequent occurrence of short circuit as the internal electrodes become thinner is electrode curling which occurs during sintering in the process of manufacturing the multilayer capacitors.

Generally, the internal electrodes are formed of nickel. Metals have characteristics that higher surface tension thereof makes a width of a surface thereof be reduced at high temperatures, thus changing to a spherical shape. Therefore, when the internal electrodes are sintered, the nickel internal electrodes cannot withstand a flat form at a temperature at which dielectric is sintered but are curled up (or clustered) due to the high surface tension characteristics of nickel.

In order to solve the problem of curling of the nickel internal electrodes which causes a short-circuit failure in the multilayer capacitor, it is necessary to lower the surface tension.

SUMMARY

An aspect of the present disclosure may provide a multilayer ceramic capacitor with improved reliability.

According to an aspect of the present disclosure, a multilayer capacitor may include: a body including a plurality of dielectric layers and a plurality of first and second internal electrodes alternately exposed to opposing surfaces of the body in a length direction with respective dielectric layer interposed therebetween; and first and second external electrodes disposed at opposing ends of the body in the length direction and connected to the first and second internal electrodes, respectively. The plurality of first and second internal electrodes include nickel (Ni) and antimony (Sb).

The content of Sb in the plurality of first and second internal electrodes may be within a range from 0.01 at % to 5 at %, based on a total content of the first and second internal electrodes.

The content of Sb in the plurality of first and second internal electrodes may be within a range from 0.1 at % to 1 at %, based on a total content of the first and second internal electrodes.

The plurality of first and second internal electrodes may further include germanium (Ge).

The content of Ge in the plurality of first and second internal electrodes may be 0.01 at % to 5 at %, based on a total content of the first and second internal electrodes.

The content of Ge in the plurality of first and second internal electrodes may be within a range from 0.1 at % to 1 at %, based on a total content of the first and second internal electrodes.

According to another aspect of the present disclosure, a multilayer capacitor may include: a body including a plurality of dielectric layers and a plurality of first and second internal electrodes alternately exposed to opposing surfaces of the body in a length direction with respective dielectric layer interposed therebetween; and first and second external electrodes disposed at opposing ends of the body in the length direction and connected to the first and second internal electrodes, respectively. The plurality of first and second internal electrodes include nickel (Ni) and germanium (Ge).

The content of Ge in the plurality of first and second internal electrodes may be 0.01 at % to 5 at %, based on a total content of the first and second internal electrodes.

The content of Ge in the plurality of first and second internal electrodes may be within a range from 0.1 at % to 1 at %, based on a total content of the first and second internal electrodes.

The plurality of first and second internal electrodes may further include antimony (Sb).

The content of Sb in the plurality of first and second internal electrodes may be 0.01 at % to 5 at %, based on a total content of the first and second internal electrodes.

The content of Sb in the plurality of first and second internal electrodes may be within a range from 0.1 at % to 1 at %, based on a total content of the first and second internal electrodes.

BRIEF DESCRIPTION OF DRAWINGS

The above and other aspects, features and other advantages of the present disclosure will be more clearly understood from the following detailed description taken in conjunction with the accompanying drawings, in which:

FIG. 4 is a view illustrating elements which are completely dissolved in nickel to become an alloy;

DETAILED DESCRIPTION

Exemplary embodiments of the present disclosure will now be described in detail with reference to the accompanying drawings.

Multilayer Capacitor

Figure 1:
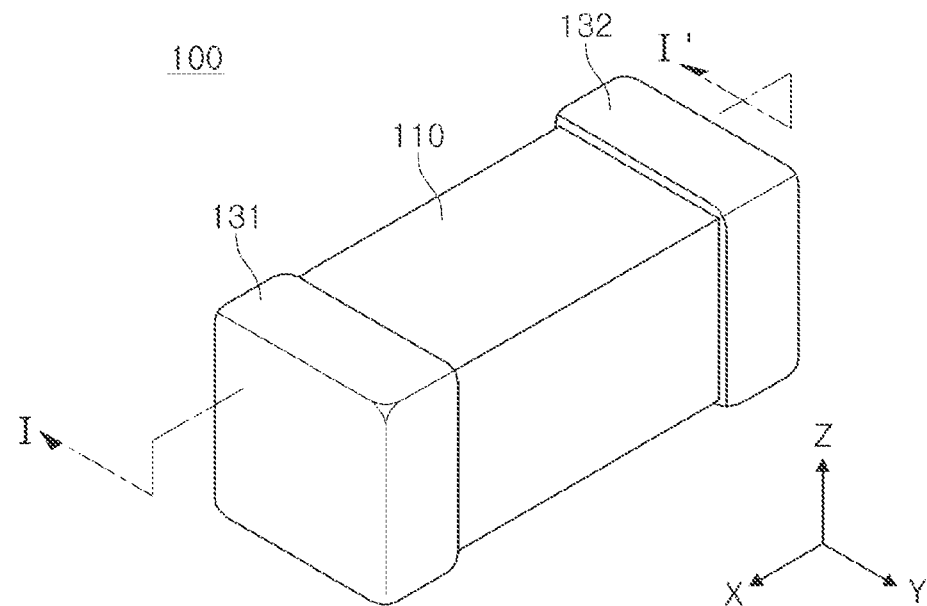
FIG. 1 is a perspective view schematically illustrating a multilayer capacitor according to an exemplary embodiment in the present disclosure.
Figure 2:
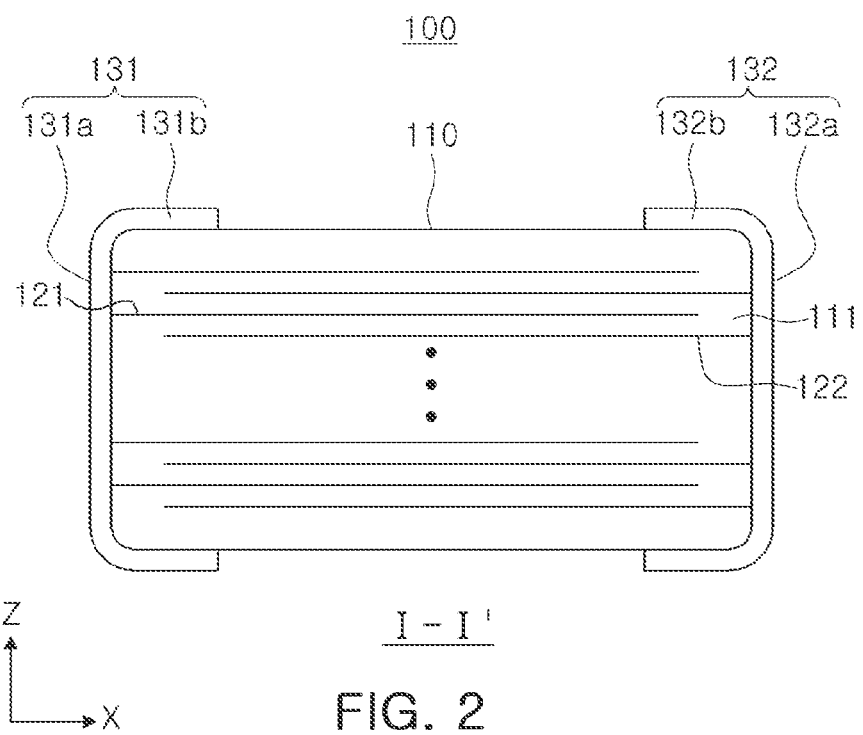
FIG. 2 is a cross-sectional view taken along line I-I' of FIG. 1.

FIG. 1 is a perspective view schematically illustrating a multilayer capacitor according to an exemplary embodiment in the present disclosure, and FIG. 2 is a cross-sectional view taken along line I-I' of FIG. 1.

Referring to FIGS. 1 and 2, a multilayer capacitor 100 according to the present exemplary embodiment includes a body 110 and first and second external electrodes 131 and 132.

The body 110 includes an active region including a plurality of dielectric layers 111 stacked in the Z direction and a plurality of first and second internal electrodes 121 and 122 alternately arranged in the Z direction with the dielectric layer 111 interposed therebetween and cover regions disposed above and below the active region.

The body 110 is formed by stacking the plurality of dielectric layers 111 and first and second internal electrodes 121 and 122 in the Z direction and subsequently sintering the same. The body 110 is not limited in shape and may have a substantially hexahedral shape, as illustrated.

Here, the body 110 may have first and second surfaces opposing each other in the Z direction, third and fourth surfaces connecting the first and second surfaces and opposing each other in the X direction, and fifth and sixth surfaces connecting the first and second surfaces, connecting the third and fourth surfaces, and opposing each other in the Y direction.

The plurality of dielectric layers 111 are in a sintered state and adjacent dielectric layers 111 are integrated such that the boundary therebetween may not be readily apparent without using a scanning electron microscope (SEM).

Here, the thickness of the dielectric layer 111 may be arbitrarily changed according to capacity design of the multilayer ceramic capacitor 100.

The dielectric layer 111 may include a ceramic powder having a high dielectric constant, for example, a barium titanate ($BaTiO_3$)-based or strontium titanate ($SrTiO_3$)-based powder or magnesium titanate, and the present disclosure is not limited thereto as long as sufficient capacitance is obtained.

In addition, at least one of a ceramic additive, an organic solvent, a plasticizer, a binder, a dispersant, and the like, may be further added to the dielectric layer 111 together with the ceramic powder, if necessary.

The cover regions, margins of the body 110 in the Z direction, are formed by arranging covers on opposing outermost sides of the body 110 in the Z direction.

The covers may have the same material and configuration as those of the dielectric layer 111, except that the covers do not include an internal electrode.

The covers may be formed by stacking a single dielectric layer or two or more dielectric layers on the opposing outermost sides of the body 110 in the Z direction, and basically serve to prevent damage to the first and second internal electrodes 121 and 122 due to physical or chemical stress.

The first and second external electrodes 131 and 132 may be formed of a conductive paste including a conductive metal.

The conductive metal may be, for example, nickel (Ni), copper (Cu), palladium (Pd), gold (Au), or an alloy thereof, but the present disclosure is not limited thereto.

The first and second external electrodes 131 and 132 may include first and second connection portions 131a and 132a and first and second band portions 131b and 132b.

The first and second connection portions 131a and 132a are disposed on the opposing side surfaces of the body 110 in the X direction and the first and second band portions 131b and 132b extend to portions of a lower surface of the body 110, i.e., a mounting surface, from the first and second connection portions 131a and 132a.

Here, the first and second band parts 131b and 132b may further extend to at least one of portions of an upper surface of the body 110 and opposing side surfaces of the body 110 in the Y direction. Accordingly, bonding strength of the first and second external electrodes 131 and 132 may be improved.

In the present exemplary embodiment, it is illustrated and described that the first and second band portions 131b and 132b of the first and second external electrodes 131 and 132 extend from the first and second connection portions 131a and 132a to portions of the upper surface of the body 110 and the opposing side surfaces of the body 110 in the Y direction, but the present disclosure is not limited thereto.

The first and second internal electrodes 121 and 122, to which opposite polarities are applied, are disposed in the body 110 and are disposed alternately in the Z direction with the dielectric layer 111 interposed therebetween.

Here, the first and second internal electrodes 121 and 122 may be electrically insulated from each other by the dielectric layer 111 disposed therebetween.

Also, the first and second internal electrodes 121 and 122 include nickel (Ni) and antimony (Sb).

A small amount of Sb injected into the first and second internal electrodes 121 and 122 allows the internal electrodes including Ni to be more resistant to heat when sintering is performed in the process of manufacturing the multilayer capacitor. Thus, after the sintering, curling of the first and second internal electrodes 121 and 122 may be reduced and the first and second internal electrodes 121 and 122 may be more flattened.

This is because Sb has low surface energy and thus is distributed on a surface of nickel when alloyed with nickel. Here, the change in the surface characteristics is considered to better bonding between the common material delaying shrinkage of the internal electrodes and the surface of nickel.

Thus, when curling of the first and second internal electrodes 121 and 122 is reduced and the first and second internal electrodes 121 and 122 are flattened, reliability (mean time to failure (MTTF)) of the multilayer capacitor may be improved.

Meanwhile, the first and second internal electrodes 121 and 122 may include Ge.

Figure 3:
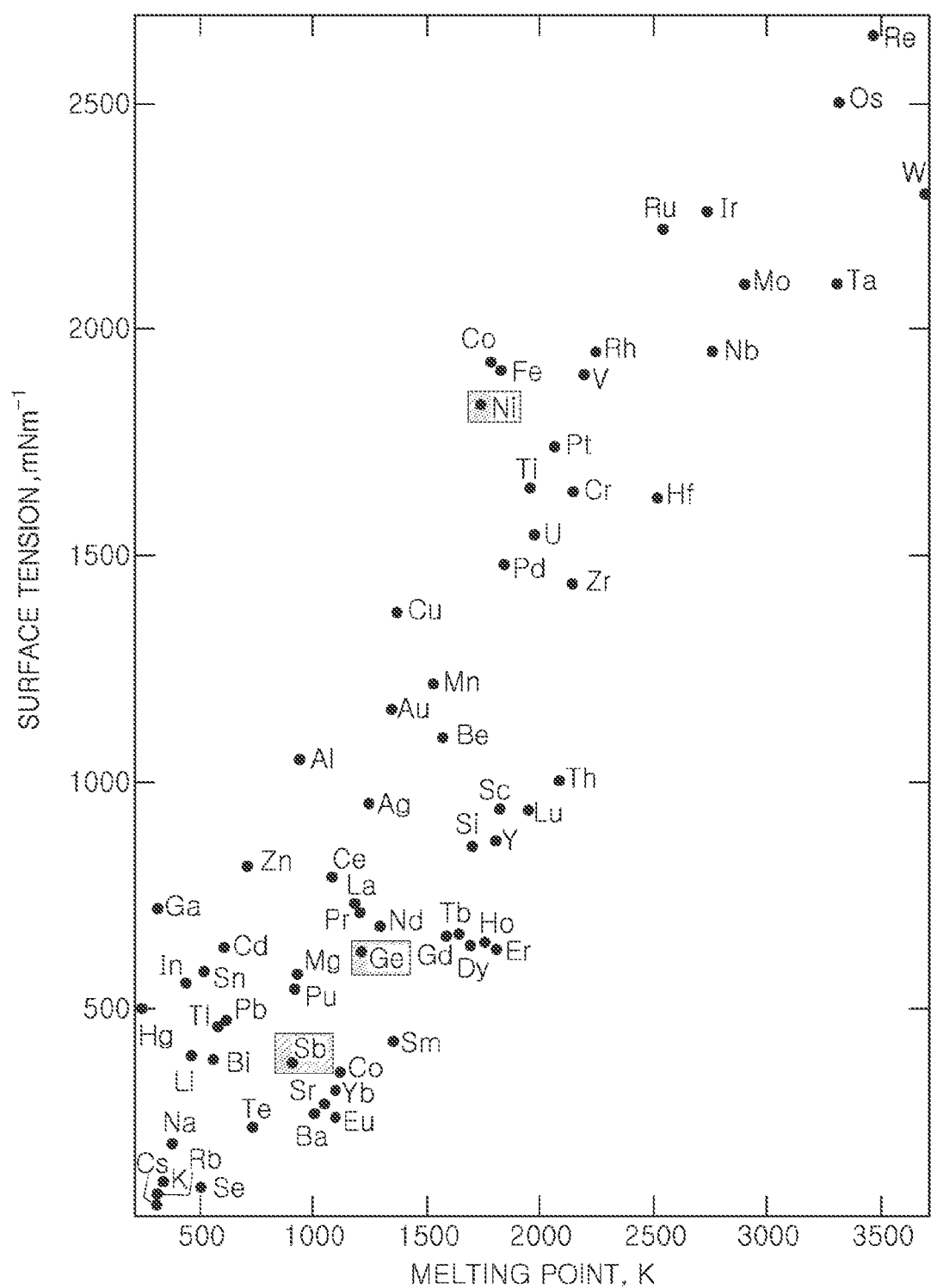
FIG. 3 is a graph illustrating surface tension of various materials.
Figure 5:
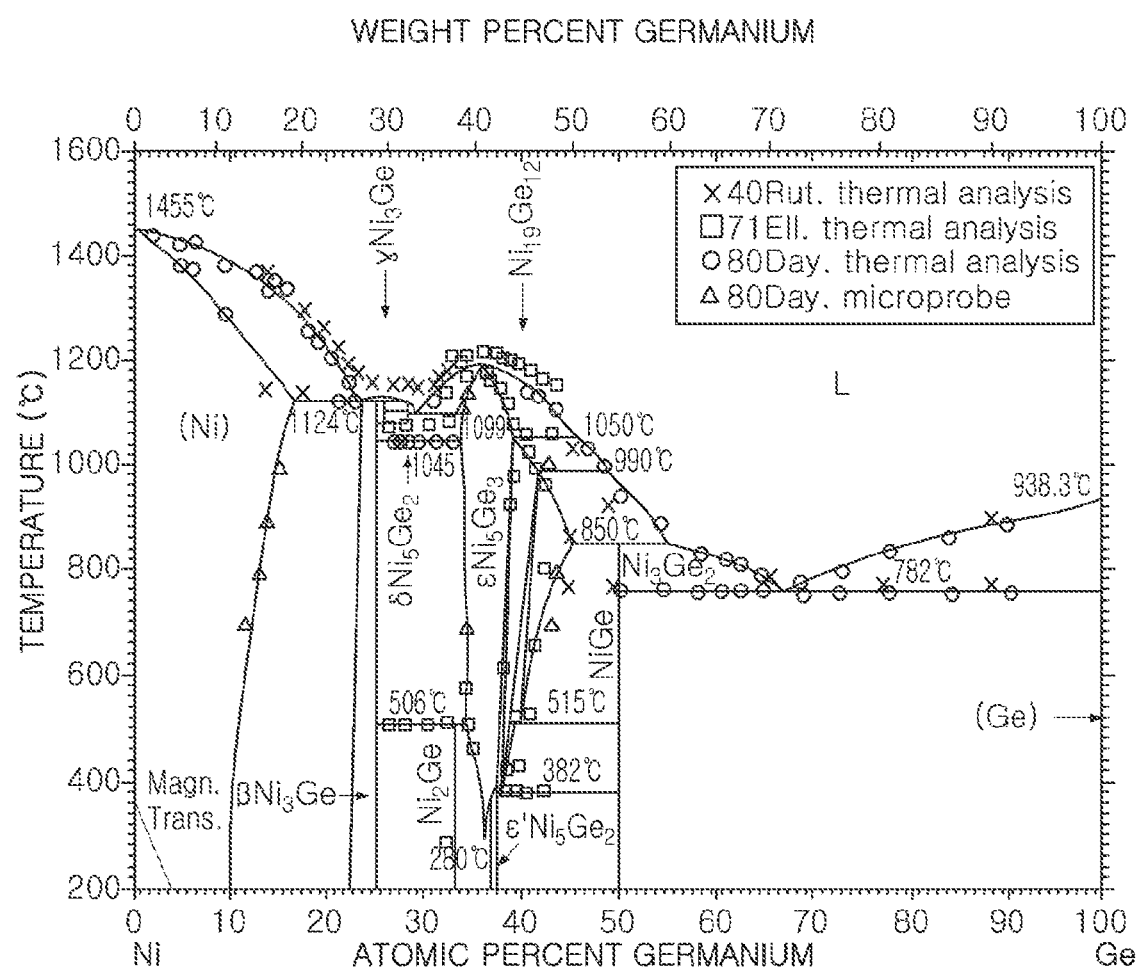
FIG. 5 is a phase diagram of Ni—Ge.

As illustrated in FIG. 5, when a small amount of Ge is applied to Ni, Ge may be dissolved. Ge is a material having low surface tension, compared with nickel as illustrated in FIG. 3.

Therefore, Ge may improve reliability (MTTF) of the multilayer capacitor by acting on the internal electrodes similarly to the above-described Sb.

Table 1 shows capacity and MTTF measured after multilayer capacitors having length×width×thickness of 0.6× 0.3×0.3 mm were manufactured by injecting Sb or Ge into the internal electrodes.

Here, the content and distribution of Sb and Ge are detected by mapping the internal electrodes by wavelength dispersive X-ray spectroscopy (WDX) at the cross-sections of the multilayer capacitors.

In Table 1, in sample 1, a comparative example, the internal electrodes do not include both Sb and Ge.

TABLE 1

| # | Metal included in internal electrode | at % | Capacity (μF) | MTTF (hr) |
|---|---|---|---|---|
| 1 | — | 0 | 5.22 | 112 |
| 2 | Sb | 0.01 | 5.18 | 116 |
| 3 | Sb | 0.1 | 5.34 | 136 |
| 4 | Sb | 1 | 5.23 | 143 |
| 5 | Sb | 5 | 5.02 | 116 |
| 6 | Sb | 10 | 4.77 | 88 |
| 7 | Ge | 0.01 | 5.11 | 120 |
| 8 | Ge | 0.1 | 5.08 | 125 |
| 9 | Ge | 1 | 5.01 | 131 |
| 10 | Ge | 5 | 4.81 | 122 |
| 11 | Ge | 10 | 3.33 | 74 |

Referring to Table 1, it can be seen that, when the content of Sb increases, the capacity is within a certain range, while the MTTF gradually increases, and the content of Sb decreases again from 5 at %, based on a total content of the first and second internal electrodes, and in the case of sample 6 in which the content of Sb exceeds 5 at %, the capacity is significantly lowered as compared with the comparative example and MTTF is also lower than that of the comparative example.

That is, in the multilayer capacitor using the internal electrodes including Sb of 0.01 at % to 5 at %, based on a total content of the first and second internal electrodes, the MTTF characteristics are relatively improved, while realizing a capacity level similar to that of the comparative example.

Also, referring to Table 1, it can be seen that, when the content of Ge increases, the capacity is within a certain range, while the MTTF gradually increases, and the content of Ge decreases again from 5 at %, and in the case of sample 11 in which the content of Sb exceeds 5 at %, the capacity is significantly lowered as compared with the comparative example and MTTF is also lower than that of the comparative example.

That is, in the multilayer capacitor using the internal electrodes including Ge of 0.01 at % to 5 at %, the MTTF characteristics are relatively improved, while realizing a capacity level similar to that of the comparative example.

As described above, the reason why the excellent reliability is obtained when Sb or Ge is added to the internal electrodes is because Sb and Ge may be dissolved in nickel to form an alloy, and since Sb and Ge are materials with low surface tension, they form a nickel alloy to reduce surface tension of the internal electrodes.

Referring to FIG. 3, it can be seen that Sb and Ge have significantly lower surface tension than Ni and that Sb and Ge are easily alloyed with nickel as illustrated in FIG. 4.

When Sb or Ge is alloyed to lower the surface tension, electrode curling may be effectively prevented when the internal electrodes are sintered at a high temperature, and also, since a large amount of the alloyed heterogeneous elements is distributed on the surfaces of the internal electrodes to lower the surface tension and Sb or Ge distributed on the surfaces of the internal electrodes forms an oxide film more easily than Ni, increasing bonding force with the common material to improve thermal contraction properties.

In Table 1, the reason why Sb exhibits MTTF better than Ge is because Sb is lower in surface tension than Ge.

Also, the content of Sb or Ge in the first and second internal electrodes 121 and 122 exhibits excellent MTTF characteristics at 0.01 at % to 5.0 at %, based on a total content of the first and second internal electrodes. This is because Sb or Ge is easily dissolved in Ni in the content range.

Figure 6:
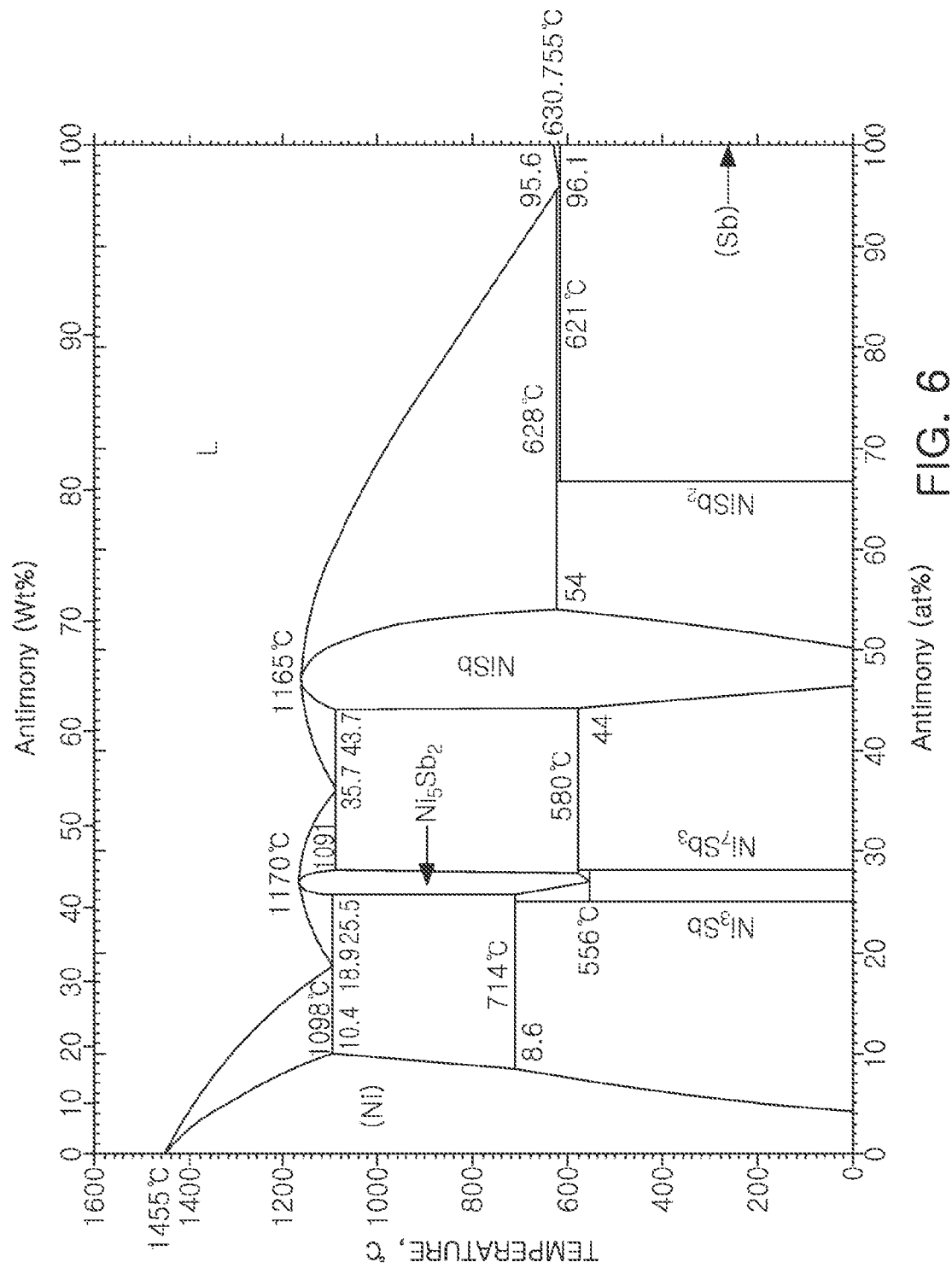
FIG. 6 is a phase diagram of Ni—Sb.

FIG. 6 shows a phase diagram of Ni—Sb.

Referring to FIG. 6, it can be seen that Sb may be dissolved in Ni at a maximum of 8 at % to 9 at % at 1,100° C. and 4 at % to 5 at % at room temperature.

Also, research results in 1970s to 1980s regarding nickel super-alloy studies showed that Sb precipitates to the surface when Sb is added to nickel. As a result, when Sb is added to the internal electrodes, it may be precipitated to the interface, lowering the surface tension of the alloy, improving reliability of the capacitor.

Also, as the content of Sb increases in nickel, the surface tension of the alloy is lowered but electrical resistance disadvantageously increases.

That is, as illustrated in FIG. 6, the content of Sb is completely dissolved in Ni at room temperature up to 5 at %, based on a total content of the first and second internal electrodes, and, at a higher content, $Ni_3Sb$ is precipitated to significantly hinder electrical conductivity.

Therefore, as illustrated in Table 1, it can be seen that when Sb is added in an amount exceeding 5 at %, the capacity, as well as the MTTF, is lowered. It is also confirmed that the characteristics are improved even when the amount of Sb is 0.01 at %.

That is, in the present composition, a content of Sb may be within a range from 0.01 at % to 5.0 at %, based on a total content of the first and second internal electrodes.

When the internal electrodes of the multilayer capacitor are formed by the paste including Ni and Sb, surface tension of the internal electrodes may be lowered, and when Sb is alloyed, Sb is precipitated to the surface, lowering interface potential and resistance with a dielectric layer to improve reliability of the multilayer capacitor.

As set forth above, according to exemplary embodiments of the present disclosure, the internal electrodes are formed of a paste including Ni and Sb to lower surface tension of the internal electrodes, and when Sb is alloyed, Sb is precipitated to the surface, lowering interface potential and resistance with a dielectric layer to improve reliability of the multilayer capacitor.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
    a body including a plurality of dielectric layers and a plurality of first and second internal electrodes alternately exposed to opposing surfaces of the body in a length direction with respective dielectric layers interposed therebetween,
    wherein the plurality of first and second internal electrodes include nickel (Ni) and antimony (Sb), and a content of Sb in the plurality of first and second internal electrodes is within a range from 0.01 at % to 5 at %, based on a total content of the first and second internal electrodes.

2. The multilayer capacitor of claim 1, wherein the content of Sb in the plurality of first and second internal electrodes is within a range from 0.1 at % to 1 at %, based on the total content of the first and second internal electrodes.

3. The multilayer capacitor of claim 1, wherein the plurality of first and second internal electrodes further include germanium (Ge).

4. The multilayer capacitor of claim 3, wherein a content of Ge in the plurality of first and second internal electrodes is within a range from 0.01 at % to 5 at %, based on a total content of the first and second internal electrodes.

5. The multilayer capacitor of claim 4, wherein the content of Ge in the plurality of first and second internal electrodes is within a range from 0.1 at % to 1 at %, based on the total content of the first and second internal electrodes.

6. A multilayer capacitor comprising:
a body including a plurality of dielectric layers and a plurality of first and second internal electrodes alternately exposed to opposing surfaces of the body in a length direction with respective dielectric layers interposed therebetween,
wherein the plurality of first and second internal electrodes include antimony (Sb), nickel (Ni) and germanium (Ge), and a content of Sb in the plurality of first and second internal electrodes is within a range from 0.1 at % to 1 at %, based on a total content of the first and second internal electrodes.

7. The multilayer capacitor of claim 6, wherein a content of Ge in the plurality of first and second internal electrodes is within a range from 0.01 at % to 5 at %, based on a total content of the first and second internal electrodes.

8. The multilayer capacitor of claim 7, wherein the content of Ge in the plurality of first and second internal electrodes is within a range from 0.1 at % to 1 at %, based on the total content of the first and second internal electrodes.

* * * * *